(12) United States Patent
McLeod et al.

(10) Patent No.: US 7,030,793 B2
(45) Date of Patent: Apr. 18, 2006

(54) ACCURATE TESTING OF TEMPERATURE MEASUREMENT UNIT

(75) Inventors: Scott C. McLeod, Oro Valley, AZ (US); William Castellano, Syosset, NY (US)

(73) Assignee: Standard Microsystems Corporation, Hauppauge, NY (US)

( * ) Notice: Subject to any disclaimer, the term of this patent is extended or adjusted under 35 U.S.C. 154(b) by 133 days.

(21) Appl. No.: 10/781,063

(22) Filed: Feb. 18, 2004

(65) Prior Publication Data
US 2005/0179575 A1    Aug. 18, 2005

(51) Int. Cl.
H03M 1/06    (2006.01)
(52) U.S. Cl. ...................... 341/119; 341/144
(58) Field of Classification Search ............. 341/119, 341/144
See application file for complete search history.

(56) References Cited

U.S. PATENT DOCUMENTS

| | | | |
|---|---|---|---|
| 3,672,215 A | 6/1972 | Stout et al. | |
| 3,679,992 A | 7/1972 | Yerman | |
| 4,228,684 A | 10/1980 | Templin | |
| 4,340,882 A * | 7/1982 | Maio et al. ................. | 341/118 |
| 4,636,092 A | 1/1987 | Hegyi | |
| 4,958,155 A * | 9/1990 | Gulczynski ................. | 341/120 |
| 5,195,827 A | 3/1993 | Audy et al. | |
| 5,419,637 A | 5/1995 | Frye et al. | |
| 5,982,221 A | 11/1999 | Tuthill | |
| 6,008,685 A | 12/1999 | Kunst | |
| 6,097,239 A | 8/2000 | Miranda, Jr. et al. | |
| 6,246,353 B1 * | 6/2001 | Elliott et al. ................. | 341/156 |
| 6,265,857 B1 * | 7/2001 | Demsky et al. ............. | 323/312 |
| 6,480,127 B1 * | 11/2002 | Aslan ......................... | 341/119 |
| 6,554,469 B1 | 4/2003 | Thomson et al. | |
| 6,554,470 B1 | 4/2003 | Zhang et al. | |
| 6,933,867 B1 * | 8/2005 | Honda ......................... | 341/118 |
| 6,956,516 B1 * | 10/2005 | Furuichi ..................... | 341/155 |

(Continued)

FOREIGN PATENT DOCUMENTS

DE    003637520    5/1988

(Continued)

OTHER PUBLICATIONS

Shen-Whan Chen; Trung Duong; Min-Yih Luo; "Channel Temperature Measurement Using Pulse-Gate Method," IEEE Transactions on Microwave Theory and Techniques, vol. 47, No. 3, Mar. 1999, pp. 362-365.

(Continued)

*Primary Examiner*—Linh V. Nguyen
(74) *Attorney, Agent, or Firm*—Meyertons Hood Kivlin Kowert & Goetzel, P.C.; Jeffrey C. Hood

(57) ABSTRACT

Various embodiments of a method and apparatus for simulating temperature characteristics of a diode are disclosed. The output of a diode simulator may not depend upon its ambient temperature. Therefore, it may be used to calibrate a temperature measurement unit at any ambient temperature within its operational range regardless of the temperature to which the temperature measurement unit is to be calibrated. Even if the ambient temperature of the facility in which the calibration is performed varies during the calibration procedure, the output of the diode simulator may remain constant. These characteristics of the diode simulator may allow for calibration of a temperature measurement unit in significantly less time than by using prior art methods, which include the requirement to tightly control the temperature of one or more system components.

11 Claims, 8 Drawing Sheets

U.S. PATENT DOCUMENTS

2004/0227651 A1* 11/2004 Furuichi .................. 341/120

FOREIGN PATENT DOCUMENTS

| EP | 000498799 | 5/1991 |
|----|-----------|--------|
| EP | 000741860 | 11/1996 |
| GB | 002292221 | 2/1996 |

OTHER PUBLICATIONS

Kaliyugavaradan, S.; Sankaran, P.; Murti, V.G.K.; "Application Of Reciprocal Time Generation Technique To Digital Temperature Measurement," IEEE Transactions on Instrumentation and Measurement, vol. 43, No. 1, Feb. 1994, pp. 99-100.

Cao Hui; Huang Junnai; "Circuit Design and Implementation for Digital Temperature and Humidity Measurement and Control," ASIC, 2001. Proceedings. 4th International Conference on Oct. 23-25, 2001, pp. 502-505.

Michael P. Timko, "A Two-Terminal IC Temperature Tranducer", IEEE JSSC vol. SC-11, No. 6, Dec. 1976, pp. 784-788.

Szajda et al. "A Low Noise, High Resolution Silicon Temperature Sensor", IEEE JSSC, vol. 31, No. 9, Sep. 1996, pp. 1308-1313.

* cited by examiner

ACCURATE TESTING OF TEMPERATURE MEASUREMENT UNIT

BACKGROUND OF THE INVENTION

1. Field of the Invention

This invention relates to integrated circuits, and more particularly, to the testing of temperature measurement integrated circuits.

2. Description of the Related Art

It is well known that the voltage drop of a forward biased PN junction varies in a complementary fashion with respect to absolute temperature. For example, in a BJT a change in Vbe relative to a change in absolute temperature may be in the range of −1 to −1.5 millivolts per kelvin and linear to a first order approximation. This relationship may be referred to as complementary to absolute temperature (CTAT). On the other hand, the difference in the value of base-emitter voltage for a transistor operating at a first collector current density, J1, versus the value of Vbe when the transistor is operated at a second collector current density, J2, may be directly proportional to absolute temperature (PTAT).

The relationship between temperature and the difference in the value of base-emitter voltage may be given by:
$T=q*(Vbe1-Vbe2)/(k*\ln(J1/J2))$ where $k=1.38\times10^{-23}$, Boltzmans constant T=absolute temperature in kelvins $q=1.602\times10^{-19}$, charge of an electron J1=the collector current density for Vbe1

J2=the collector current density for Vbe2

Temperature measuring devices may be constructed which measure the base-emitter voltage of a transistor operating first at one current density and then at a different current density and then use the above relationship to calculate the corresponding value for temperature. For example, a typical temperature-measuring device based on this principle may use a temperature sensing diode located at the point where the temperature measurement is desired. A first known current may be applied to the diode and the corresponding voltage drop across the diode may be recorded. Immediately subsequently, a second known current may be applied to the diode and the corresponding voltage drop across the diode may again be recorded. Since only a single diode is used in this device, the ratio of the current densities may be the same as the ratio of the applied currents. This ratio along with the two measurements for Vbe may be sufficient to solve the equation given above for absolute temperature, which may then be readily converted into any desired units of measure.

In order to calibrate or determine the accuracy of a temperature measuring device such as the one described above, it may be necessary to place a temperature sensing diode in an environmentally controlled chamber in which the temperature may be accurately measured and controlled. The accuracy with which the temperature of the environment can be controlled and measured may determine the accuracy with which the temperature-measuring device can be calibrated. For example, if an environmental chamber is capable of maintaining an internal temperature to within plus or minus one half degree, the accuracy of the temperature measuring device being calibrated may be somewhat less than this figure.

Also, the amount of time needed for an environmental chamber to reach a steady state temperature and for the device under test to achieve thermal equilibrium with the environment is typically quite large. The time required for a device under test to achieve thermal equilibrium with the environment of a typical thermal chamber after a change has been made to the desired temperature of the chamber may be on the order of several hours. Therefore, determining the accuracy of a temperature-measuring device at many points over a wide range of temperatures may be a very time-consuming undertaking.

SUMMARY

Various embodiments of a method and apparatus for simulating temperature characteristics of a diode are disclosed. The output of a diode simulator may not depend upon its ambient temperature. Therefore, it may be used to calibrate a temperature measurement unit at any ambient temperature within its operational range regardless of the temperature to which the temperature measurement unit is to be calibrated. For example, if the ambient temperature of the facility in which the calibration is to be performed is 70 degrees F. and it is desired to calibrate the temperature measurement unit to a temperature of 100 degrees F., inputting data corresponding to 100 degrees F. on the desired test temperature input may cause the output of the diode simulator to correspond to the voltage drop across a diode at 100 degrees F. Even if the ambient temperature of the facility in which the calibration is performed varies during the calibration procedure, the output of the diode simulator may remain constant. These characteristics of the diode simulator may allow for calibration of a temperature measurement unit in significantly less time than by using prior art methods, which include the requirement to tightly control the temperature of one or more system components.

In one embodiment, a diode simulator may include a current level detector and a voltage level generator. The function of the current level detector may be to sense the level of current being supplied by a temperature measurement unit and to determine if the level is high or low relative to a reference level while outputting this same level of current unmodified back to the temperature measurement unit. In some embodiments, this may be accomplished by inserting a resistance in the current flow path, to develop a voltage that is proportional to the current and comparing the voltage thus developed to a reference voltage. Once the high/low determination has been made, current level detector may generate a logic-level signal that is at logic 1 when the input current is at a high level and is at logic 0 when the input current is at a low level. The current level detector may supply this logic signal to a voltage level generator.

The voltage level generator may force a difference of potential, Vbe, between the input and output nodes corresponding to the base-emitter voltage of a temperature-sensing, diode-connection transistor. When the current level indicator signal from the current level detector is low, the voltage level generator may force the voltage between the input and output nodes to approximate the voltage drop across a forward-biased PN junction. For example, if the diode simulator is implemented as an integrated circuit using CMOS technology, the voltage level generator may force approximately 0.65 V difference of potential between the input and output nodes. In some embodiments this voltage may be developed, by passing a current through one or more resistors such that the current multiplied by the resistance is equal to the desired difference of potential.

BRIEF DESCRIPTION OF THE DRAWINGS

Other aspects of the invention will become apparent upon reading the following detailed description and upon reference to the accompanying drawings in which.

Figure 1:
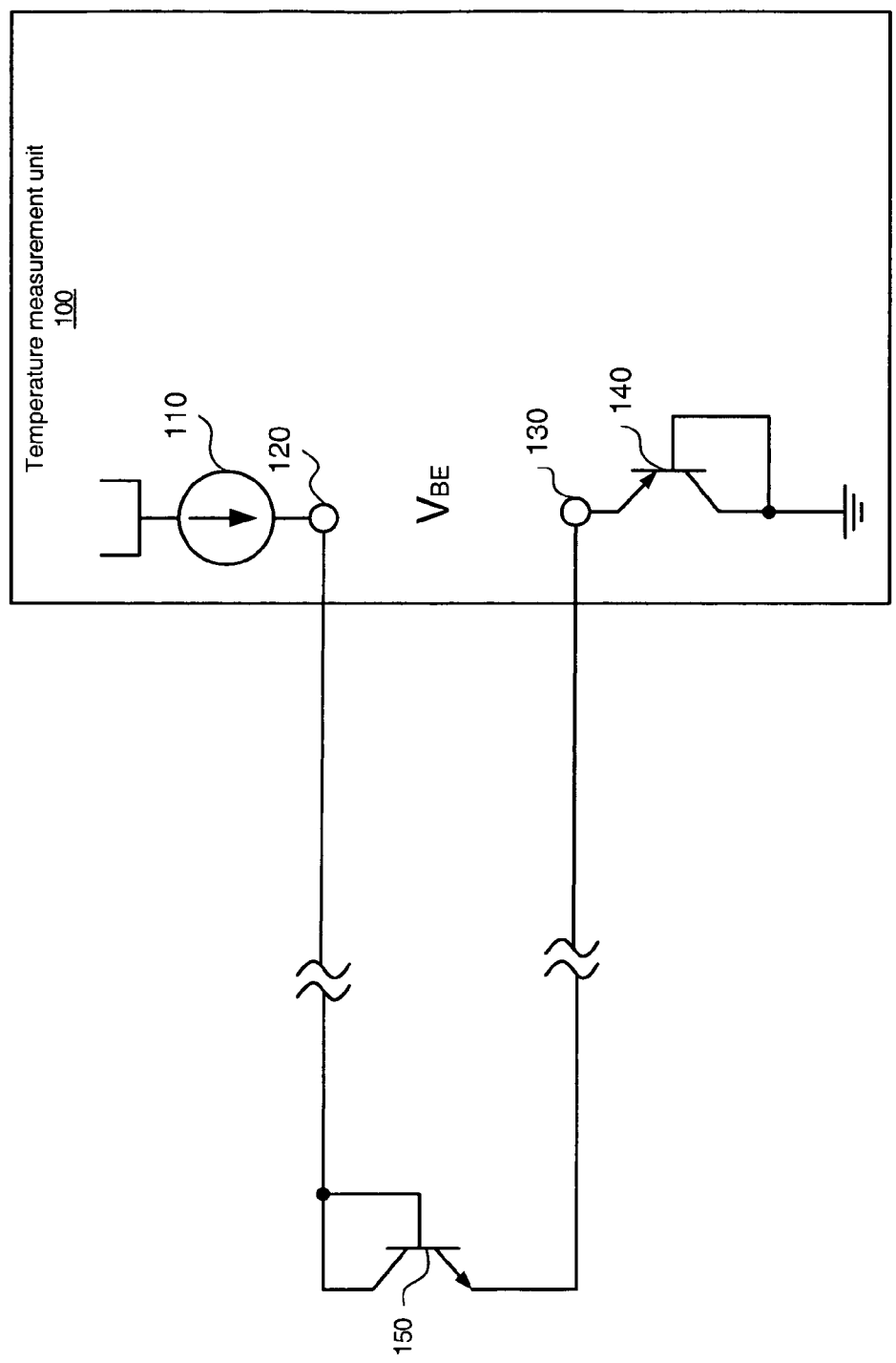
FIG. 1 shows a diagram of a device for measuring temperature, according to prior art.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF EMBODIMENTS

FIG. 1 shows a diagram of a prior art temperature measurement unit 100 that determines the temperature of a diode-connected transistor, which may be located remotely from the unit. It is well known that the voltage drop of a forward biased PN junction varies in a complementary fashion with respect to absolute temperature. For example, in a BJT a change in Vbe relative to a change in absolute temperature may be in the range of −1 to −1.5 millivolts per kelvin and linear to a first order approximation. This relationship may be referred to as complementary to absolute temperature (CTAT). On the other hand, the difference in the value of base-emitter voltage for a transistor operating at a first collector current density, J1, versus the value of Vbe when the transistor is operated at a second collector current density, J2, may be directly proportional to absolute temperature (PTAT).

The relationship between temperature and the difference in the value of base-emitter voltage may be given by:
$T = q*(Vbe1-Vbe2)/(k*\ln(J1/J2))$
where $k=1.38\times10^{-23}$, Boltzmans constant
T=absolute temperature in kelvins
$q=1.602\times10^{-19}$, charge of an electron
J1=the collector current density for Vbe1
J2=the collector current density for Vbe2

The temperature-measuring device of FIG. 1 may be constructed to measure the base-emitter voltage of transistor 150 operating first at one collector current density and then at a different collector current density, and then use the above relationship to calculate the corresponding value for temperature. A typical temperature-measuring device based on this principle may use a temperature sensing diode 150 located at the point where the temperature measurement is desired. A first known current may be applied to the diode by constant current source 110 and the corresponding voltage drop across the diode (V 120 minus V 130) may be recorded. Immediately subsequently, a second known current may be applied to the diode by current source 110 and the corresponding voltage drop across the diode may again be recorded. Since only a single diode is used in this device, the ratio of the collector current densities may be the same as the ratio of the applied currents. This ratio along with the two measurements for Vbe may be sufficient to solve the equation given above for absolute temperature, which may then be readily converted into any desired units of measure.

In order to calibrate or determine the accuracy of a temperature measuring device such as the one described above, it may be typically necessary to place the temperature sensing diode 150 in an environmentally controlled chamber in which the temperature may be accurately measured and varied. The accuracy with which the temperature of the environment can be controlled and measured may determine the accuracy with which the temperature-measuring device can be tested or calibrated. For example, if an environmental chamber is capable of maintaining an internal temperature to within plus or minus one half degree, the accuracy of the temperature measuring device being calibrated may be somewhat less than this figure.

Also, the amount of time needed for an environmental chamber to reach a steady state temperature and for the device under test to achieve thermal equilibrium with the environment is typically quite large. The time required for a device under test to achieve thermal equilibrium with the environment of a typical thermal chamber after a change has been made to the desired temperature of the chamber may be on the order of several hours. Therefore, determining the accuracy of a temperature-measuring device at many points over a wide range of temperatures using prior art methods may be a very time-consuming undertaking.

Figure 2:
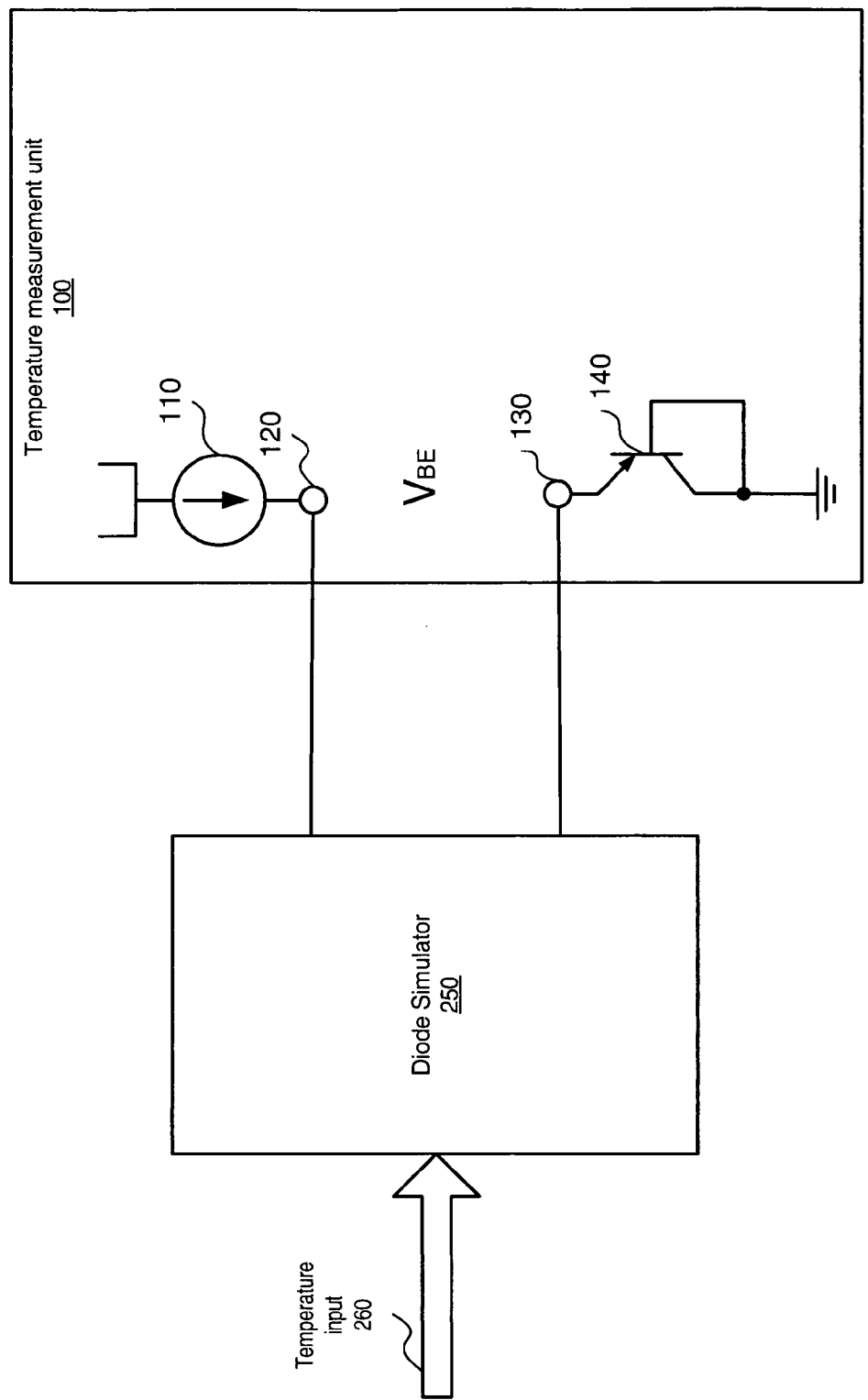
FIG. 2 shows the connection of temperature measurement unit to a diode simulator, according to one embodiment.

FIG. 2 illustrates a diode simulator 250, according to one embodiment. Diode simulator 250 my pass the current supplied by current source 110 to diode-connected transistor 140 of the temperature measurement unit without modification. For example, if temperature measurement unit 100 supplies two levels of current to node 120 in a square wave pattern, diode simulator 250 may supply the same two levels of current in the same square wave pattern to node 130 of the temperature measurement unit. In response to desired temperature input 260 and the level of current being output by current source 110 of the temperature measurement unit, diode simulator 250 may output a voltage Vbe equal to V 120 minus V 130 corresponding to the base-emitter voltage of a diode-connected temperature-sensing transistor, which is independent of the temperature of the diode simulator 250. In one embodiment, desired test temperature input 260 may be established by a set of switches attached to diode simulator 250. In other embodiments, desired test temperature input 260 may be supplied to diode simulator 250 from a personal computer or other device coupled to the simulator by an interconnect such as a bus.

The output of diode simulator 250 may not depend upon its ambient temperature. Therefore, it may be used to calibrate temperature measurement unit 100 at any ambient temperature within its operational range regardless of the temperature to which the temperature measurement unit is to be calibrated. For example, if the ambient temperature of the facility in which the calibration is to be performed is 70 degrees F. and it is desired to calibrate temperature measurement unit 100 to a temperature of 100 degrees F., inputting data corresponding to 100 degrees F. on desired test temperature input 260 may cause the output of the diode simulator 250 to correspond to the voltage drop across a diode at 100 degrees F. Even if the ambient temperature of the facility in which the calibration is performed varies during the calibration procedure, the output of the diode simulator 250 may remain constant. These characteristics of the diode simulator may allow for calibration of a temperature measurement unit 100 in significantly less time than by using prior art methods, which include the requirement to tightly control the temperature of one or more system components.

Figure 3:
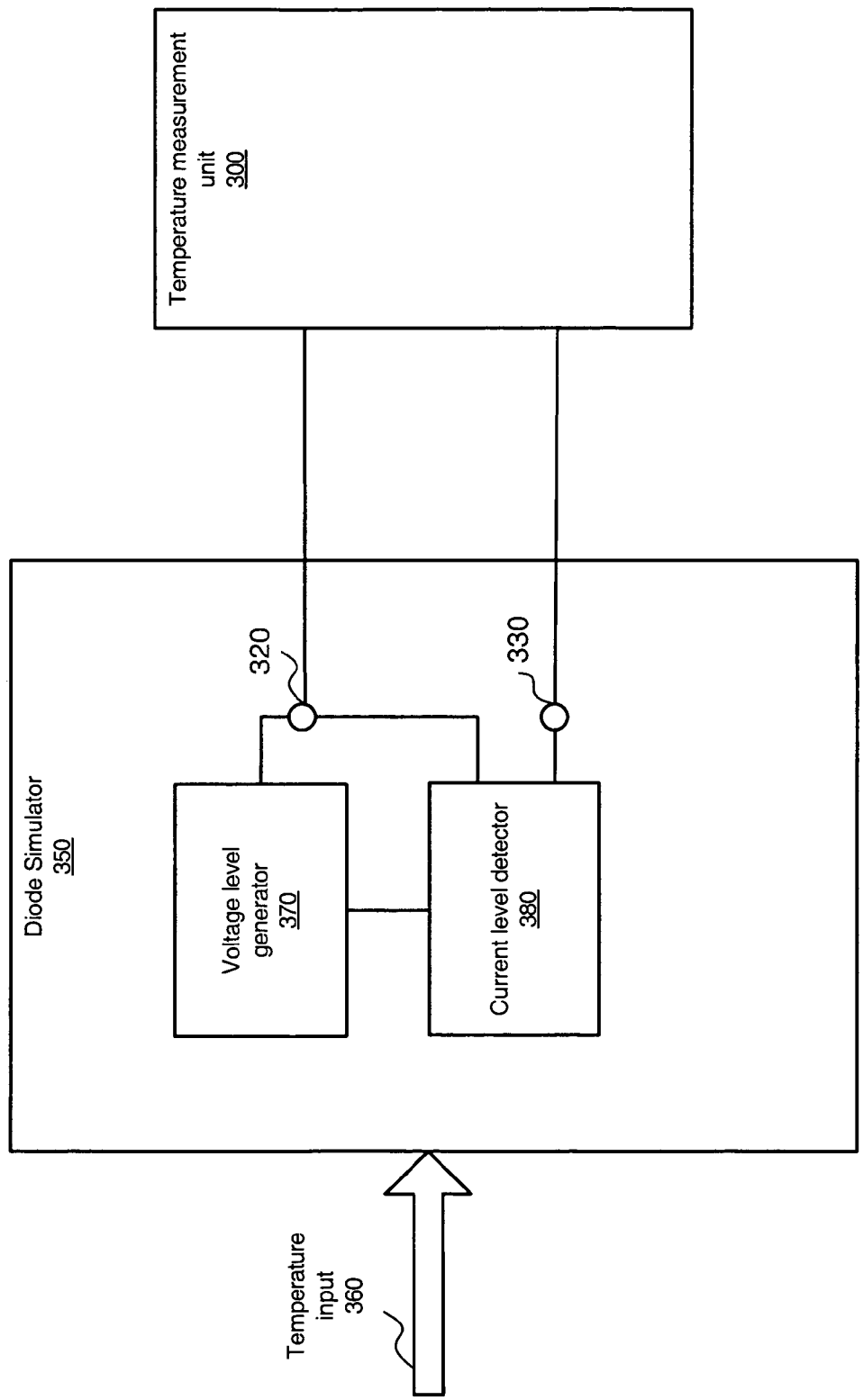
FIG. 3 is a diagram of components of a diode simulator, according to one embodiment.

FIG. 3 shows a block diagram of the major components of diode simulator 350, according to one embodiment. The function of current level detector 380 may be to sense the level of current being supplied by temperature measurement unit 300 to node 320 and to determine if the level is higher or lower than an internally generated reference current. It may also output the received current unmodified to node 330 and thence return it to the temperature measurement unit. In some embodiments, this may be accomplished by inserting a resistance in the current flow path to develop a voltage that is proportional to the received current and comparing the voltage thus developed to a reference voltage derived similarly from the reference current. Once the high/low determination has been made, current level detector 380 may generate a logic-level signal that is at logic 1 when the input current is at a high level and is at logic 0 when the input current is at a low level. Current level detector 380 may supply this logic signal to voltage generator 370.

Voltage level generator 370 may force a difference of potential, Vbe, between nodes 320 and 330 corresponding to the base-emitter voltage of a temperature-sensing, diode-connection transistor. When the current level indicator signal from current level detector 380 is low, voltage level generator 370 may force the voltage at node 320 to assume a value such that the difference of potential between nodes 320 and 330 approximates the voltage drop across a forward-biased PN junction. For example, if the diode simulator is implemented as an integrated circuit using CMOS technology, the voltage level generator 370 may force approximately 0.65 V difference of potential between nodes 320 and 330. In some embodiments, this voltage may be developed by passing a current through one or more resistors, such that the current multiplied by the resistance is equal to the desired difference of potential.

When the current level indicator signal from current level detector 380 is high, voltage level generator 370 may force the voltage at node 320 to assume a value such that the difference of potential between nodes 320 and 330 approximates the voltage drop across a forward-biased PN junction plus and additional amount determined by the desired input temperature 360. In some embodiments, desired temperature input data received at 360 may be input to a digital to analog converter to produce a current proportional to the data. This current may be added to the current described previously and passed through the resistance to produce a difference of potential between nodes 320 and 330 equal to approximately 0.65V plus some delta V. Delta V may represent the change in base-emitter voltage of a diode-connected, temperature-sensing transistor attributable to the temperature of the transistor. When temperature measurement unit 300 measures the difference of potential between nodes 320 and 330 for high and low output current levels, the difference between the high reading and low reading may be the delta V produced by voltage level generator 370 corresponding to the data from the desired temperature input 360. Temperature measurement unit 300 may interpret this measured delta V as delta Vbe for a diode-connected, temperature-sensing transistor to determine a temperature according to the relationship: $T = q*(delta\ Vbe)/(k*ln(J1/J2))$. Thus, the desired input temperature data input to the diode simulator 350 may be compared to the temperature measurement output of the temperature measurement unit 300 to determine the accuracy of the temperature measurement reading independent of the temperature of the diode simulator.

Figure 4:
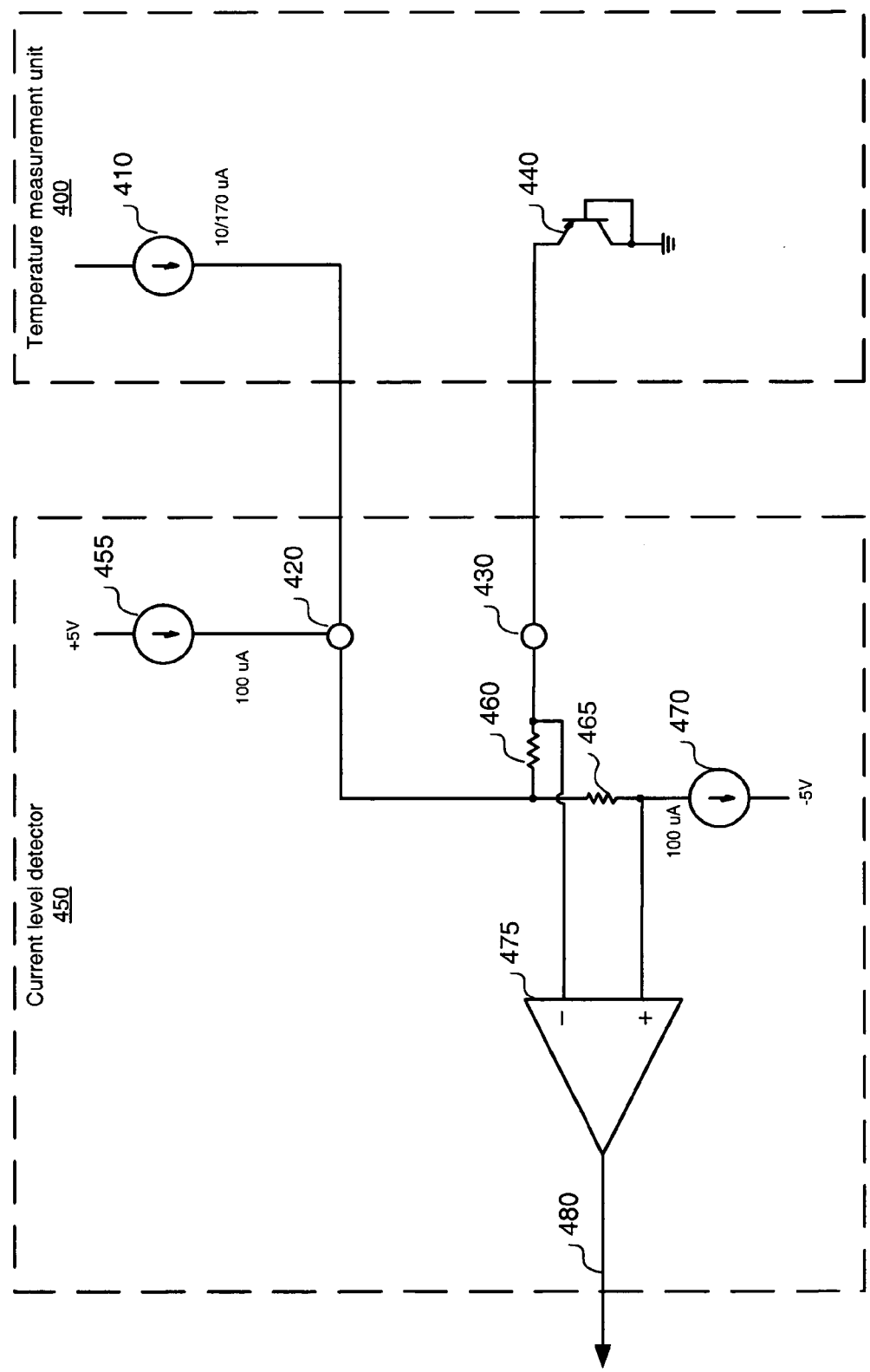
FIG. 4 is a diagram of components of a current level detector, according to one embodiment.

FIG. 4 illustrates a current level detector 450, according to one embodiment. Temperature measurement unit 400 may deliver current at alternating levels of 10 and 170 micro Amperes from current source 410 to node 420 of the current level detector. Current source 455 may add a current between the low and high levels of current from the temperature measurement unit to node 420. For example, current source 455 may add 100 uA to the input current at node 420. Current sink 470 may draw the same amount of current through resistor 465 from node 420 as current source 455 adds. Since the same amount of current is added by current source 455 and subtracted by current sink 470 within current level detector 450, the current flowing from node 430 into diode-connected transistor 440 in the temperature measurement device may be exactly the same as that provided by current source 410.

A constant voltage drop may be generated from node 420 to the positive input of comparator 475 across resistor 465 by the 100 uA of current supplied by constant source 455 and removed by constant current sink 470. Selecting the values of resistors 460 and 465 to be equal along with selecting the current through resistor 465 to be near the average of the high and low levels of input current from the temperature measurement unit may insure that when the input current is low the voltage drop across resistor 460 is smaller than that across resistor 465. Since the voltage applied to comparator 475 is the difference between the voltage drops across resistors 465 and 460, the voltage drop across resistor 465 may dominate and insure a negative voltage is applied to the comparator and thus a logic low (0) level for output signal 480.

When the current supplied by the temperature measurement unit is at a high level, the voltage drop across resistor 460 may be larger than that across resistor 465. Since this voltage drop is negative with respect to the drop across resistor 465, the difference between the two will be positive, providing a positive input voltage to comparator 475 and a logical high (1) level for output 480. Therefore, the output 480 of the current level detector 450 may track the input current level from the temperature measurement unit 400 providing a logic 0 when the input current level is low and a logic 1 when the input current level is high. Note that this signal is generated without affecting the level of current input from the temperature measurement device as it flows into node 420 and is returned through node 430.

Figure 5:
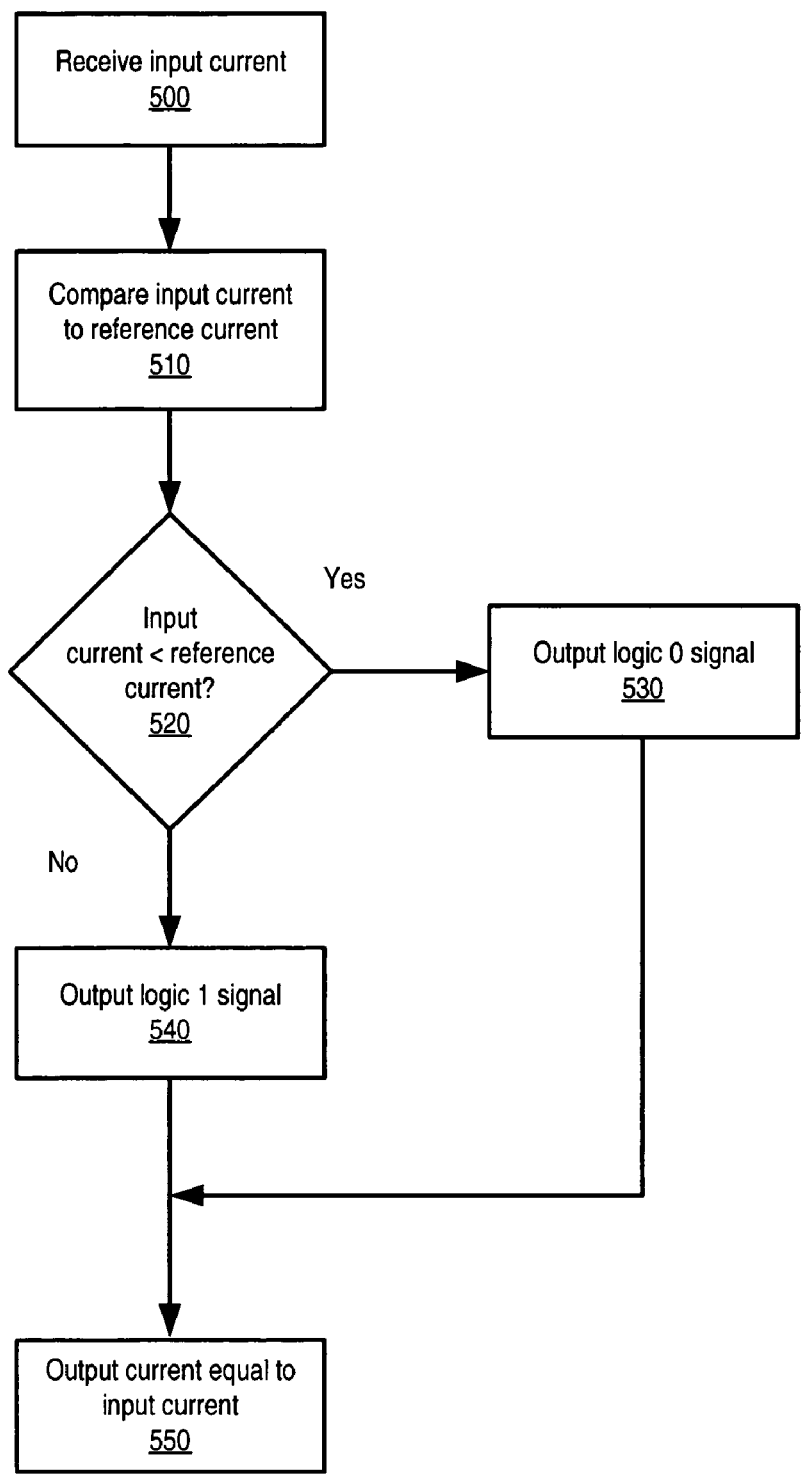
FIG. 5 is a flowchart of one embodiment of a method of operating a current level detector.

FIG. 5 is a flowchart for operating a current level detector, according to one embodiment. At 500, an input current may be received and passed through a resistance to produce a voltage drop proportional to the input current. A reference current generated internally to the current level detector may also passed through a resistance to produce a reference voltage, which is proportional to the reference current. By choosing the values of the two previously mentioned resistances to be equal, the voltage drops produced may be in the same proportion to the currents from which they are derived, and their magnitudes may be compared directly, as shown at block 510.

The voltage derived from the input current may be applied to the negative input of a comparator while the voltage derived from the reference current is applied to the positive input of the comparator. In this fashion, the comparator may be able to determine whether the input current is greater than or less than the reference current, as illustrated by the decision block 520. The comparator may output a logic 1 signal level when the magnitude of the input current is greater than that of the reference current, as indicated in block 530, and may output a logic 0 signal level when the magnitude of the input current is less than that of the reference current, as shown in block 540. In either case, the current level detector may return a current equal to the input current to the device under test, as illustrated by block 550.

Figure 6:
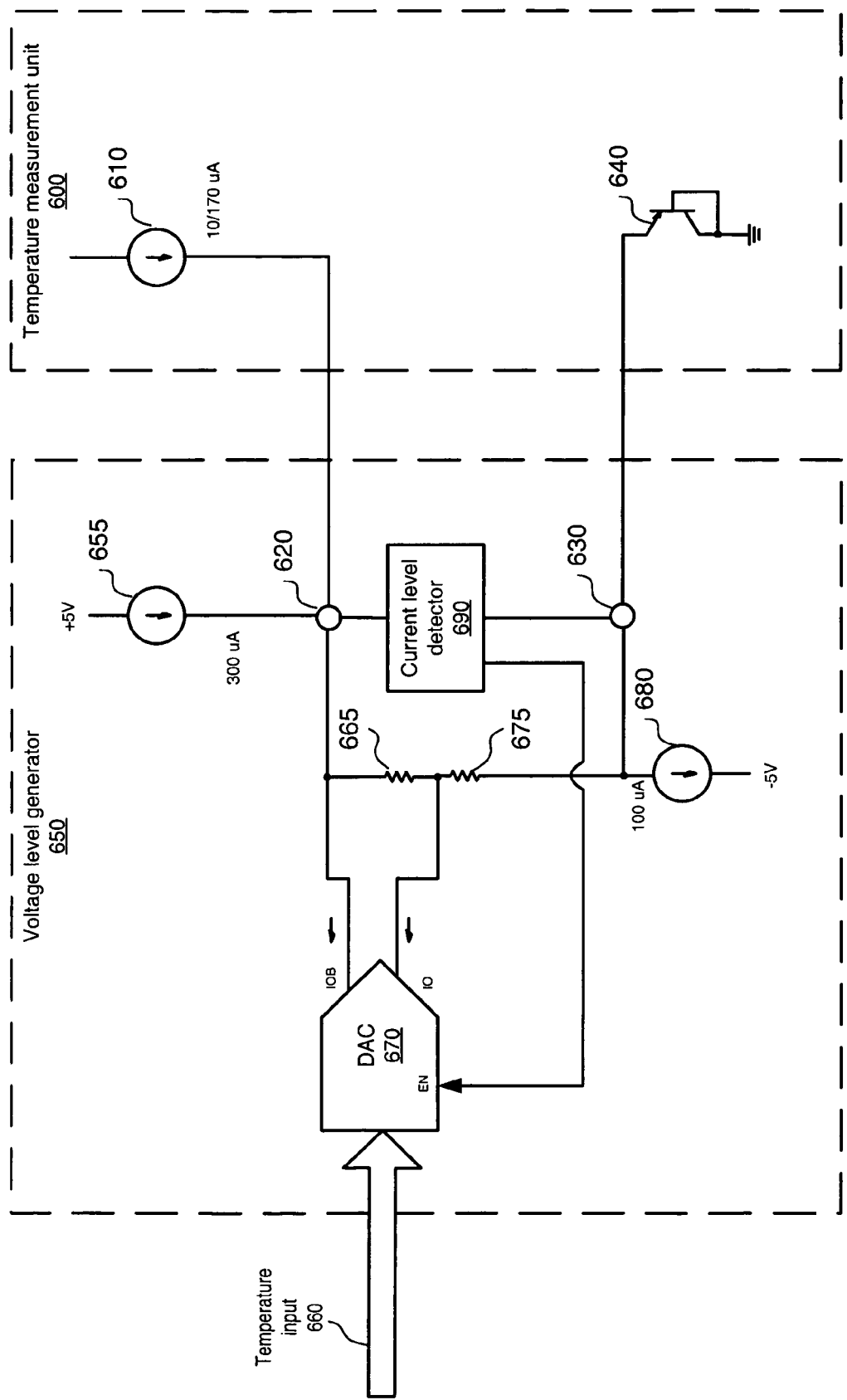
FIG. 6 is a diagram of components of a voltage level generator, according to one embodiment.

FIG. 6 illustrates a voltage level generator 650, according to one embodiment. Temperature measurement unit 600 may deliver current at alternating levels of 10 and 170 micro Amperes from current source 610 to node 620 of the voltage level generator. This current may pass through current level detector 690 and out to transistor 640 without alteration as described previously with respect to FIG. 4. The digital-to-analog converter (DAC) enable signal from the current level detector 690 may track the input current level from temperature measurement unit 600 such that when the input current level is at 10 micro Amperes, the input signal is at logic 0, and when the input current level is at 170 micro Amperes, the input signal is at logic 1.

The DAC enable signal may be used to gate the desired temperature input 660 to DAC 670. When input signal 690 is at logic 0, DAC 670 may interpret its input as all zeros regardless of the state of desired temperature input bus 660. DAC 670 may sink a current proportional to the value of its digital input through IO. DAC 670 may sink a current proportional to the complement of the value of its digital input through IOB. Therefore, the sum of the currents sunk by DAC 670 through IO and IOB may be constant. For example, a constant current source may supply 200 micro Amperes of current to node 620 for the purpose of providing IO and IOB currents to DAC 670.

When the DAC enable signal is at a logic 0 level, DAC 670 may interpret its desired temperature input as all zeros and sink no current through IO, while sinking 200 through IOB. Current source 655 may supply an additional 100 micro Amperes of current, which passes through resistors 665 and 675 to be sunk by constant current sink 680. The values of resistors 665 and 675 may be selected such that the voltage drop from node 620 to node 630 when 100 micro Amperes of current is flowing through the resistors is approximately equal to the voltage drop across a diode-connected, temperature sensing transistor.

When the DAC enable signal is at a logic 1 level, DAC 670 may sense the data on desired temperature input bus 660 and output a current proportional to this value on IO. This current may flow through resistor 665, and the resultant voltage drop may add to the voltage drop from node 620 to node 630. Temperature measurement unit 600 may measure the increased voltage drop caused by DAC current through resistor 665 and interpret this as an indication of the temperature of a temperature-sensing diode.

Figure 7:
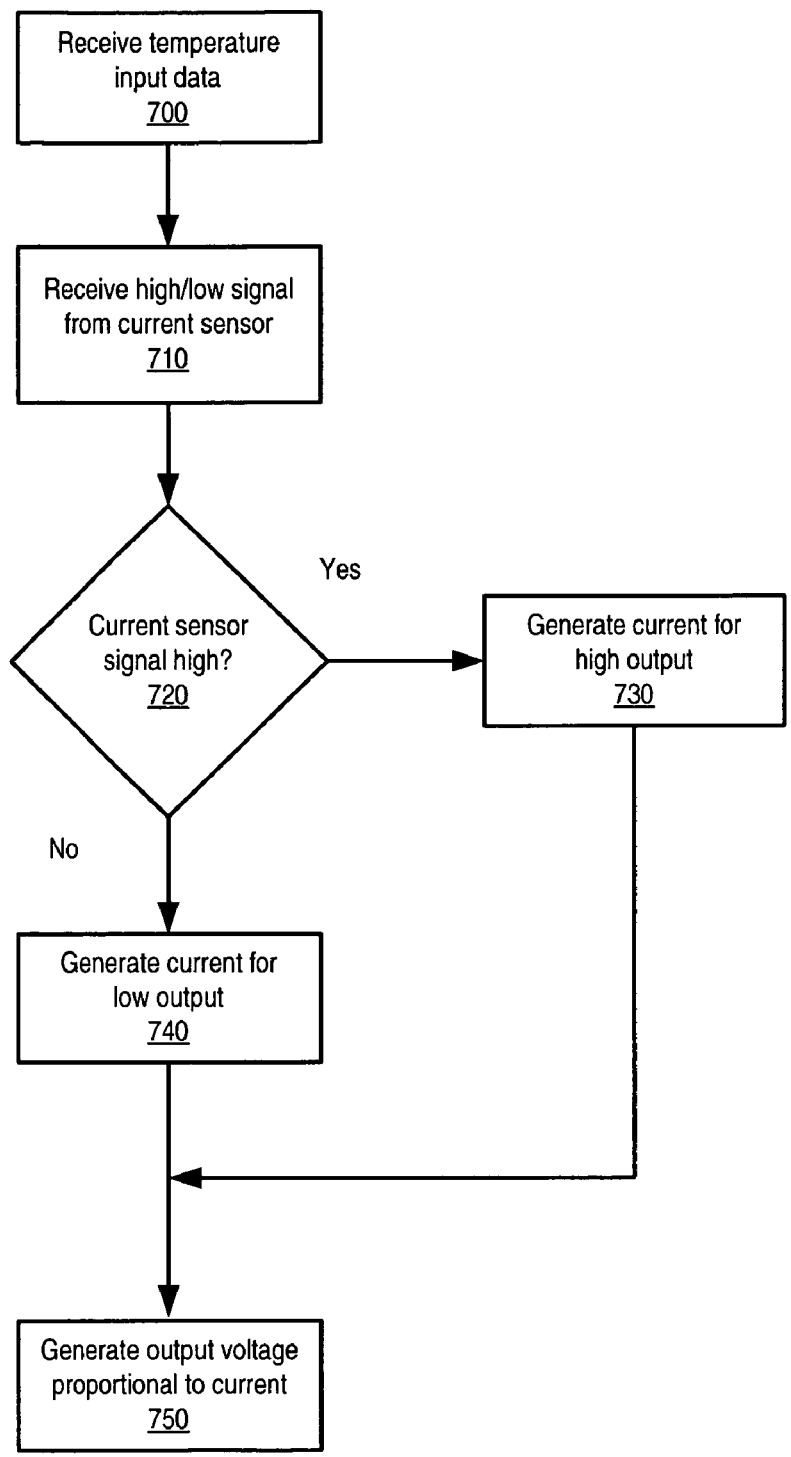
FIG. 7 is a flowchart of one embodiment of a method of operating a voltage level generator.

FIG. 7 is a flowchart of a method for operating a voltage level generator, according to one embodiment. At 700, data specifying a temperature for which diode characteristic simulation is desired may be received, along with an indication of the current level being output by the device under test, as shown in block 710. As illustrated in decision block 720, if the input signal from the current level sensor is low, a low level of current may be generated, as shown at block 740 and passed through a resistance to develop a proportional output voltage, as indicated at 750.

If the input signal from the current level sensor is high, as determined at decision block 720, then the desired temperature input data may be used to generate a proportional current, as shown in block 730, which may be added to the low-level current described previously. The composite current, thus generated, may be passed through a resistance to develop a proportional voltage drop, as indicated at block 750.

Figure 8:
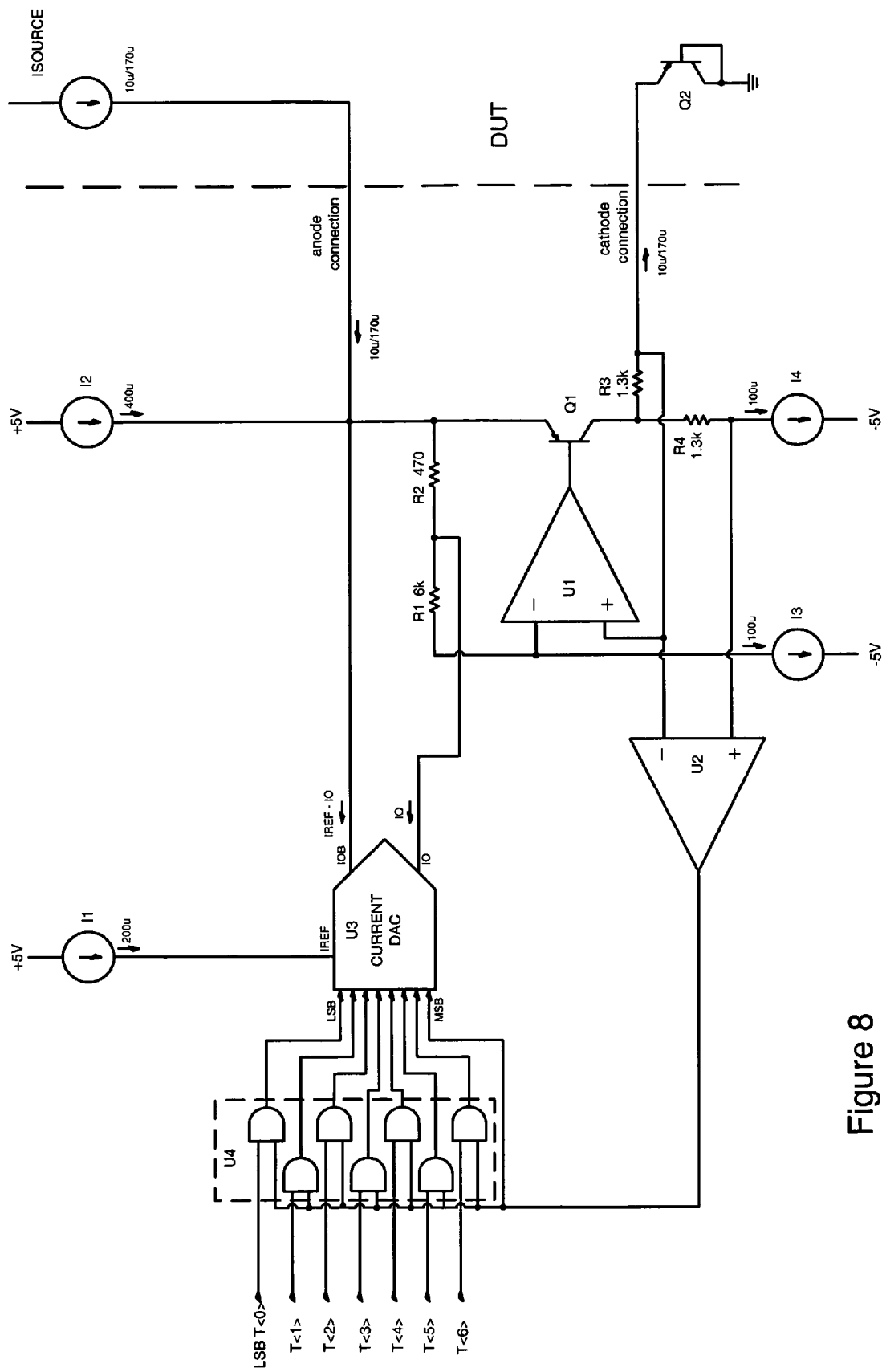
FIG. 8 is a schematic diagram of a diode simulator, according to one embodiment.

FIG. 8 is a schematic diagram of the components of a diode simulator, according to one embodiment. Multiple current sources are used in this circuit. Exemplary current sources for this application may include REF200 current sources from TI. Other exemplary components may include National Semiconductor's DAC0802 for the current DAC (U3), Maxim's MAX4131 for the op amp (U1) and MAX4190 for the comparator (U2). Please note that all these parts may be replaced with comparable components.

The eight-bit DAC has two complementary current outputs. The output currents are described by the following equations $$IO = (T<0:7>/256) * I1 \qquad (1)$$

$$IOB = ((255 - T<0:7>)/256) * I1 \qquad (2)$$

where: T<0:7>=decimal equivalent of the 8-bit DAC input and I1=200 uA

It can be seen that the sum of IO and IOB is always (255/256)*200 uA=199.2 uA.

Seven of the eight address bits (T<0:6>) are brought out to the outside world and are used to command different delta $V_{BE}$ values. These seven bits are the seven LSBs of the DAC. The series of AND gates labeled U4 enable the T<0:6> address when the output of comparator U2 is high and cause all DAC address bits to go low when the output of the comparator goes low. The MSB of the DAC is tied directly to the output of the comparator so that in all cases when the comparator is low its output is zero and when the comparator goes high the DAC MSB goes high. Therefore, the equation for the DAC output current, IO, is zero whenever the output of the comparator is low and when it goes high the current is:

$$IO = ((128 + T<0:6>)/256) * 200 \text{ uA}. \qquad (3)$$

Where T<0:6> is the decimal representation of the seven bit binary input address.

This programmable current is routed to the accurate 470 Ω resistor, R2, in the feedback path of op amp U1. The only path for this current to take is through R2 since the other side of the 6 kΩ resistor (R1) is connected to a 100 uA current source and the inverting input of the op amp (U1), both of which are very high impedance. When T<0:6> are all low, the voltage developed across R2 from the DAC0802 output, IO, is 0V when the comparator is low and 47.0 mV (470 Ω*100 uA) when the comparator is high. This switching voltage across R2 is what replicates the diode voltage generated when the high and low current is applied to the temperature sensing diode in real life applications. The equation describing the voltage difference as a function of temperature for an ideal diode is as follows:

$$\Delta VBE = (kT/q) * \ln(N) \qquad (4)$$

$$T = q * \Delta VBE / (k * \ln(N)) \qquad (5)$$

where k=1.38×10$^{-23}$, Boltzmans constant

T=absolute temperature in kelvins q=1.602×10$^{-19}$, charge of an electron

N=17, high to low current ratio for this design.

Using this equation, the range of temperatures that can be simulated with the DAC output current range and the 470 Ω resistor is:

For T<0:6>=0, minimum voltage shift
ΔVBE=47.0 mV
T=192.6° K=−80.4° C.
For T<0:6>=127, maximum voltage shift
ΔVBE=93.6 mV
T=383.6° K=110.6° C.

Each LSB of the address changes the representative temperature by 1.5° C.

The operation of the op amp is as follows. With the output of the DAC, IO, equal to zero the current going through R1 and R2 is 100 uA provided by current source I3. Therefore, the voltage at the emitter of Q1 (this is the anode voltage of the DUT) will be the voltage at the non-inverting input of the op amp plus (R1+R2)*100 uA. The voltage at the non-inverting input (this is the cathode connection to the DUT) of the op amp is the voltage generated by the diode internal to the DUT (Q2), which is a function of the current through it. This voltage is typically 550 mV.

$$V\text{anode}=V\text{cathode}+100\ uA*(6\ k\Omega+470\ \Omega)\sim1.2V$$

This is the voltage desired because it is approximately equal to two diode drops that will occur with an external diode connected between the anode and cathode terminals of the DUT.

I2 provides 400 uA to the anode connection of the DUT. 199.2 uA of this current will always go to the DAC no matter what the T<0:6> address is because IO and IOB both draw current off this node and, as stated earlier, the sum of these two currents is always 199.2 uA regardless what the DAC address is. Another 100 uA of this 400 uA current flows through the feedback resistors, R1 and R2, to I3. This leaves 100.8 uA plus the switching current from the anode connection of the DUT to flow into Q1 emitter and out its collector. 100 uA of this collector current flows through R4 into I4, this develops −130 mV across R4. The rest of the collector current (essentially the current from the switching current source of the DUT) flows through R3 and into the cathode connection of the DUT, thus providing the same switching current to this port that would be there if an external diode was connected as in normal operation.

The switching current through R3 generates a switching voltage across R3 with a low of −221 mV (170 uA*1.3 kΩ) and a high of −13 mV (10 uA*1.3 kΩ). This switching voltage drives the inverting input of comparator U2 and the constant voltage of −130 mV across R4 drives the non-inverting input. When the current out of the anode connection of the DUT is low (10 uA), the voltage at the inverting input of the comparator is higher than the voltage at the non-inverting input by 117 mV and the output of the comparator is low. This causes the current output of the DAC, IO, to be zero and the voltage at the anode connection of the DUT to be:

$$V\text{low}=V\text{cathode}+100\ uA*(6\ k\Omega+470\ \Omega)=V\text{cathode}+647\ mV$$

When the current out of the DUT goes high (170 uA), the voltage at the inverting input of the comparator goes lower than that of the non-inverting input by 91 mV and the comparator output goes high. This causes the DAC output current to change to:

$$IO=((128+T<0:6>)/256)*200\ uA$$

This current flows through R2 and the voltage at the anode is:

$$V\text{high}=V\text{cathode}+100\ uA*(6\ k\Omega+470\ \Omega)+((128+T<0:6>)/256)*200\ uA)*470\ \Omega$$

$$V\text{high}=V\text{cathode}+647\ mV+(((128+T<0:6>)/256)*200\ uA)*470\ \Omega$$

The DUT measures the difference between these two voltages, Vhigh and Vlow, and calculates the temperature according to equation (5) which is repeated below:

$$T=q*\Delta VBE/(k*\ln(N))$$

$$\Delta VBE=V\text{high}-V\text{low}=V\text{cathode}+647\ mV+(((128+T<0:6>)/256)*200\ uA)*470\ \Omega-(V\text{cathode}+647\ mV)$$

$$\Delta VBE=(((128+T<0:6>)/256)*200\ uA)*470\ \Omega$$

Therefore $$T=q*(((128+T<0:6>)/256)*200\ uA)*470\ \Omega/(k*\ln(17))$$

As shown earlier the temperature range that can be replicated with this circuit is −80.4° C. to 110.6° C.

Numerous variations and modifications will become apparent to those skilled in the art once the above disclosure is fully appreciated. It is intended that the following claims be interpreted to embrace all such variations and modifications.

What is claimed is:

1. A device, comprising:
    a current level detector; and
    a voltage level generator coupled to the current level detector;
    wherein the current level detector is configured to produce an output current equal to an input current, and a logic-level signal that tracks changes in the input current;
    wherein the voltage level generator is configured to produce an output voltage in response to both the logic-level signal and desired temperature input data; and
    wherein the output voltage approximates the voltage drop across a diode passing the input current at a temperature corresponding to the desired temperature input data.

2. The device of claim 1, wherein the current level detector comprises:
    a first resistor coupled between an input node and an output node configured to produce an input voltage proportional to an input current;
    a constant current source, whose output is coupled to the input node, configured to output a reference current;
    a constant current sink configured to sink the reference current;
    a second resistor, coupled between the output of the current source and the input of the current sink, and configured to produce a reference voltage proportional to the reference current; and
    a comparator whose negative input is coupled to the output node and whose positive input is coupled to the input of the current sink, configured to output a logic low level when the input current is less than the reference current and a logic high level when the input current is greater than the reference current.

3. The device of claim 1, wherein the voltage level generator comprises:
   a first and second resistor coupled in series between an input node and an output node;
   a constant current source, whose output is coupled to the input node, configured to output a reference current plus a reference current for a digital-to-analog converter (DAC);
   a constant current sink coupled to the output node, configured to sink the reference current through the first and second resistors such that the voltage drop from the input node to the output node due to this reference current is approximately equal to the voltage drop across a diode; and
   a DAC whose reference current is provided by the constant current source and whose output is coupled to the node connecting the first and second resistors, configured to receive desired temperature input data and an indication of the level of an input current;
   wherein when the input current is at a high level, the DAC sinks current additional to the reference current through the first resistor proportional to the value of the desired input temperature data, causing a proportionate increase in the voltage drop across the first resistor and the same increase in the voltage drop between the input and output nodes; and
   wherein when the input current is at a low level, the DAC sinks no additional current through the first resistor and therefore, does not alter the voltage drop between the input and output nodes.

4. A system, comprising:
   a temperature measurement unit, also referred to as a device under test (DUT) configured to output a bi-level current signal; and
   the device as recited in claim 1, which may be referred to as a diode simulator, configured to receive the current signal from the DUT along with desired temperature input data, and further configured to output a voltage signal to the DUT;
   wherein the output voltage signal from the diode simulator approximates a voltage drop across a diode passing the input current at a temperature corresponding to the value of the desired temperature input data.

5. The system of claim 4, wherein while the DUT is being calibrated for a given temperature, both the diode simulator and the DUT are at ambient temperatures other than the given calibration temperature.

6. The system of claim 4, wherein while the DUT is being calibrated for a given temperature, both the diode simulator and the DUT are at a same ambient temperature that is different from the given calibration temperature.

7. The system of claim 4, wherein while the DUT is being calibrated for a range of temperatures, both the diode simulator and the DUT are at ambient temperatures other than the calibration temperatures.

8. The system of claim 4, wherein while the DUT is being calibrated for a range of temperatures, both the diode simulator and the DUT are at a same ambient temperature.

9. The system of claim 4, wherein the DUT is calibrated for a range of temperatures without controlling the ambient temperatures of the diode simulator or the DUT.

10. The system of claim 4, wherein the DUT is calibrated for a range of temperatures while the ambient temperature of the diode simulator and the DUT is standard temperature.

11. The system of claim 4, wherein the time required to calibrate the DUT for a temperature or range of temperatures is much less than that using prior art methods and devices due to the requirement of the prior art to tightly control the ambient temperature of one or more system components.

* * * * *